Sept 17, 1957 W. E. BLISS 2,806,568
CLUTCH LEVER STRUCTURE
Filed Aug. 22, 1955 2 Sheets-Sheet 1

INVENTOR
WILLIAM E. BLISS
Paul O. Pippel
ATTORNEY

Sept 17, 1957 W. E. BLISS 2,806,568
CLUTCH LEVER STRUCTURE
Filed Aug. 22, 1955 2 Sheets-Sheet 2
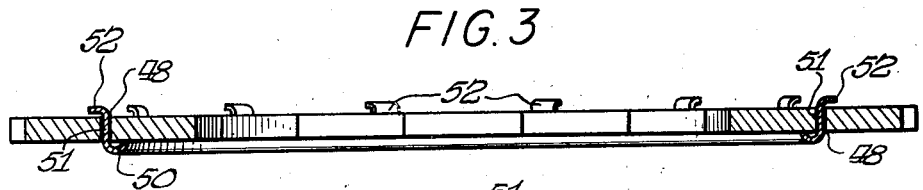
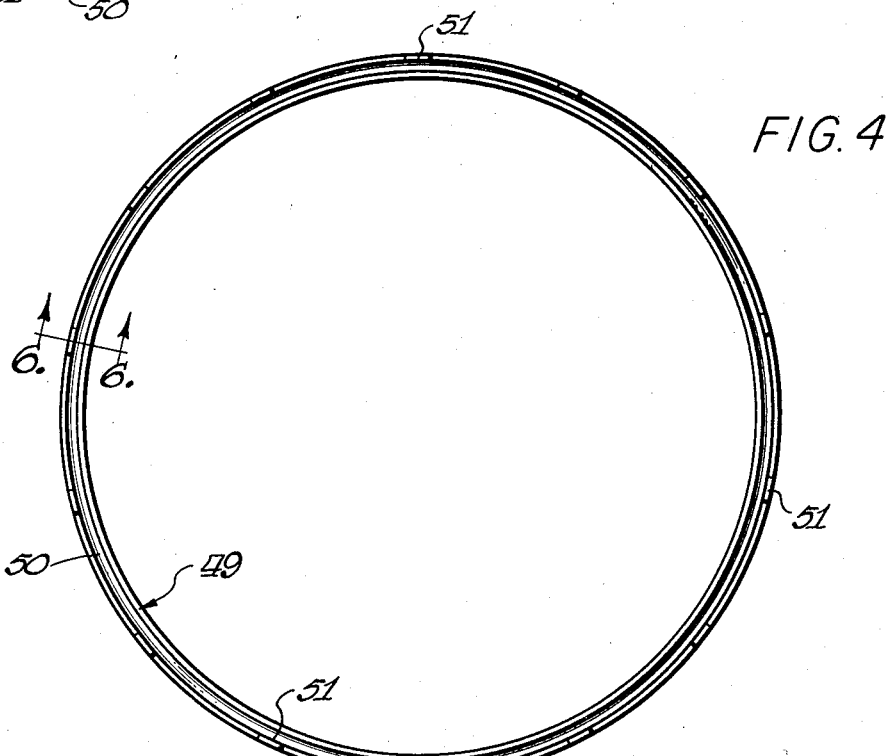
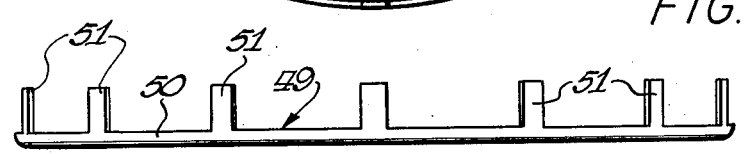
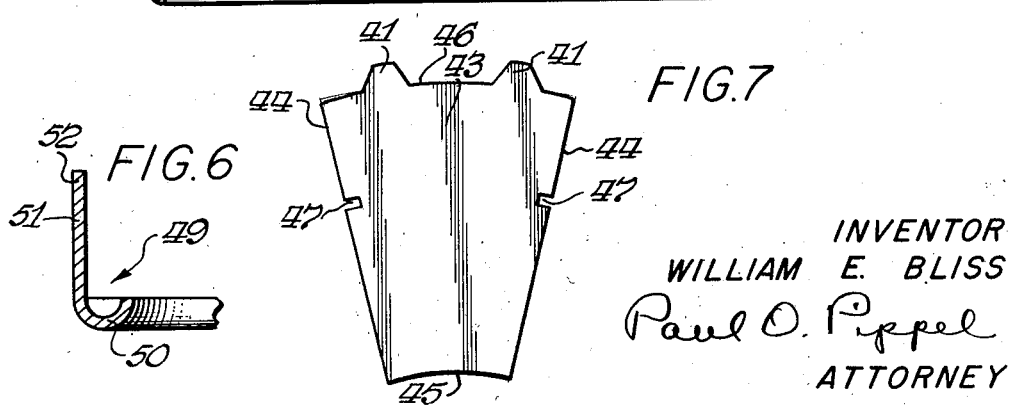
INVENTOR
WILLIAM E. BLISS
Paul O. Pippel
ATTORNEY United States Patent Office 2,806,568
Patented Sept. 17, 1957

2,806,568

CLUTCH LEVER STRUCTURE

William E. Bliss, Walnut Creek, Calif., assignor to International Harvester Company, a corporation of New Jersey Application August 22, 1955, Serial No. 529,675

8 Claims. (Cl. 192—99)

This invention relates to friction clutches of the type used in power transmission mechanisms or the like wherein a part of the clutch is movable axially between two positions to effect disengagement and engagement of the clutch, and more particularly to a new and improved motion transmitting and multiplying lever structure adapted to be interposed between and operatively connected to a power actuated axially movable piston and a clutch pressure plate.

An important object of the present invention is the provision of a clutch lever structure in the form of a circular disk which is fabricated from a plurality of individual segmental levers assembled together in a unique and novel manner whereby the levers function together to transmit and multiply forces from one movable part of a clutch mechanism to another part to effect engagement of the clutch and wherein the fingers are positively maintained in assembled relation in all phases of operation of the clutch.

A further object is the provision of a clutch lever structure comprising a group of segmental like levers economical to manufacture and when assembled in a simple manner form a clutch lever disk adapted to be incorporated with a friction clutch in a power transmission wherein it does not require very much space in relation to the comparatively large force transmitting the multiplying characteristics possessed thereby.

A still further object is the provision of an inexpensive fabricated clutch lever disk comprising a plurality of radially extending circumferentially spaced levers, any of which may be readily and inexpensively replaced in the event of damage thereto without the need of substituting a whole new clutch lever structure.

The foregoing and other important objects and desirable features inherent in and encompassed by the invention together with many of the purposes and uses thereof will become readily apparent from a reading of the ensuing description in conjunction with the annexed drawings, in which:

Figure 3 is a cross sectional view taken substantially along line 3—3 of Figure 2;

Figure 4 is a plan view of the coupling ring prior to assembly with the force transmitting and multiplying levers;

Figure 5 is a side elevational view of the coupling ring;

Figure 6 is a cross sectional view of the coupling ring taken substantially along line 6—6 of Figure 4; and Figure 7 is a plan view of one of the segmental clutch levers.

Figure 1:
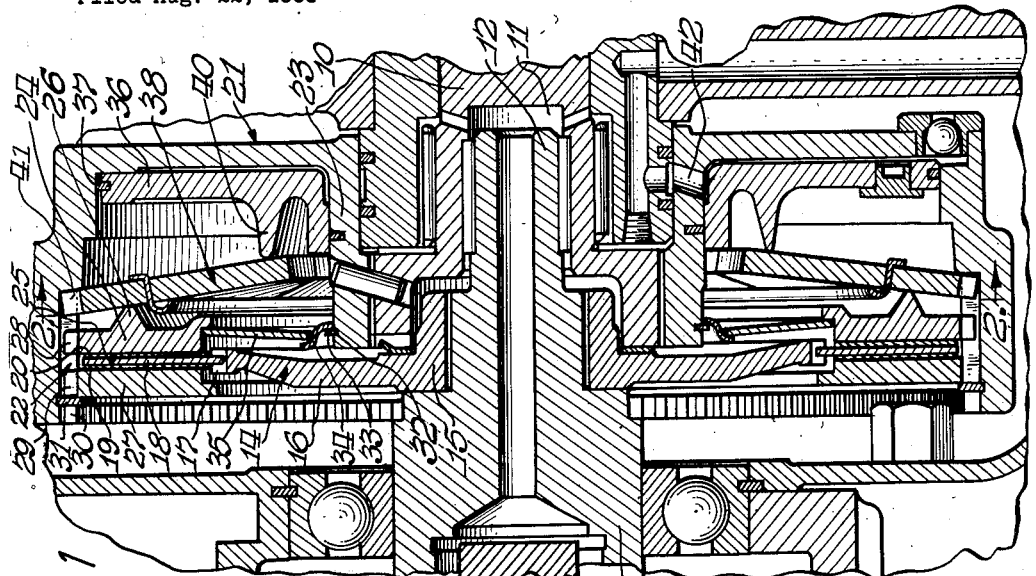
Figure 1 is an axial cross sectional view of a clutch of a portion of a power transmission embodying the invention.

Referring to the drawings in detail wherein like reference characters represent like elements, there is shown a portion of a power transmission which includes a drive shaft 10 having one end thereof provided with an axial recess 11 into which one end 12 of a coaxial driven shaft 13 is journaled. The driven clutch plate 14 has a hub portion 15 which is suitably fastened to the driven shaft 13 to rotate therewith. The clutch plate 14 includes a radial flange 16 having its peripheral edge 17 castellated for non-rotatably supporting a clutch ring 18, the opposing faces of which carry annular disks 19 and 20, respectively, of suitable high friction material. A clutch drum, designated generally by numeral 21, encloses the friction clutch 22 of which the clutch ring 18 serves as one of the friction engaging surfaces and has a hub portion 23 suitably keyed to the drive shaft 10.

The clutch pressure plate in the present invention is in the form of a ring 24 having a flat surface 25 in axial alignment with the annular disks 19 and 20. The opposite side of the pressure plate 24 has an integrally formed axially projecting annular ridge 26 thereon, the purpose of which will be explained hereinafter. The outer peripheral edges of the pressure plate 24 and the drive clutch plate, designated generally by numeral 27 and which is disposed on the side of the clutch ring 18 opposite the pressure plate 24, are provided with circumferentially spaced radially extending lugs 28 and 29, respectively, which are received in circumferentially spaced axially extending slots 30 formed in one end of the clutch drum 21. From the foregoing it will be obvious that the pressure plate 24, the drive clutch plate 27 and the clutch drum 21 are constrained to rotate together but the pressure plate 24 is capable of moving axially with respect to the clutch plate 27 and the clutch drum 21. A snap ring 31 confined in an internal groove in the clutch drum 21 prevents the clutch plate 27 from being moved axially to the left, as viewed in Figure 1, with respect to the clutch drum 21. A groove 32 is cut in the outer surface of the hub 23 of the clutch drum 21 adjacent one end thereof for receiving a snap ring 33. The ring 33 serves as an abutment for one leg of a substantially Z-shaped spring retainer ring 34. A plurality of radially extending leaf spring members or fingers 35 having their outer ends connected together are interposed between the pressure plate 24 and the retainer ring 34. The outer ends of the leaf spring members 35 abut an inwardly projecting lip formed on the pressure plate 24 and the inner ends thereof are confined by the retainer ring 34. It will be appreciated that the leaf spring members 35 resiliently urge the pressure plate 24 upwardly, as viewed in Figure 1, causing the lugs 28 to move toward the bottom of the slot 30. In this position the clutch 22 is disengaged since the clutch ring 18 is free to rotate with respect to the clutch plate 27 and the pressure plate 24. Upon the application of an axial force sufficient to overcome the resilient force of the leaf spring members 35, the pressure plate 24 moves downwardly, as viewed in Figure 1, causing a frictional engagement between the clutch ring 18 and the clutch and pressure plates 27 and 24, respectively.

In order to move the pressure plate 24 against the resilient action of the leaf spring members 35 to engage the clutch 22 hydraulically, a circular plate-like piston designated generally by numeral 36 is slidably mounted on the outer surface of the hub or sleeve 23. The piston 36 has oil sealing ring means 37 mounted on its outer periphery which engage the interior surface of the clutch drum 21. A plurality of circumferentially spaced bosses project axially from the clutch drum 32 and abut the inner surface of the piston 36 when the clutch 22 is fully disengaged, as shown in Figure 1, to axially space the piston from the radially extending wall of the clutch drum 21 and allow an annular space for receiving fluid under pressure.

The force of the piston 36 as it moves downwardly, as viewed in Figure 1, is transmitted to the pressure plate 24 by means of a clutch lever disk designated generally by numeral 38 and the construction of which forms an important part of the present invention and will, therefore, be described in detail hereinafter. The disk 38 is provided with a central circular opening 39 and the portion of the disk encircling such opening 39 is adapted to engage an axially extending boss integrally formed with the piston 36. The outer peripheral edge of the disk 38 is provided with a plurality of circumferentially spaced radially extending teeth 41 which are positioned in the slots 30 of the clutch drum 21 and are adapted to bear against the shoulders defining the bottoms of the slots 30. The annular ridge 26 formed on the pressure plate is adapted to abut a portion of the disk 38 intermediate the outer and inner peripheries. It will be noted that the intermediate portion engaged by the ridge 26 is radially spaced closer to the outer periphery than the inner periphery of the disk 38 whereby the application of a given force on the inner periphery of the disk 38 causes the disk in effect to pivot about its outer periphery which results in a transmission of a greater force to the pressure plate 24.

Fluid under pressure from an external source is introduced between the piston 36 and the radially extending wall portion of the clutch drum 21 by means of various oil ducts and passageways including a radially extending oil duct 42 formed in the clutch drum sleeve 23. Upon release of the pressure of the fluid between the clutch drum 21 and the piston 36 the spring fingers 35 move the pressure plate 24 upwardly, as viewed in Figure 1, to disengage the clutch 22.

Figure 2:
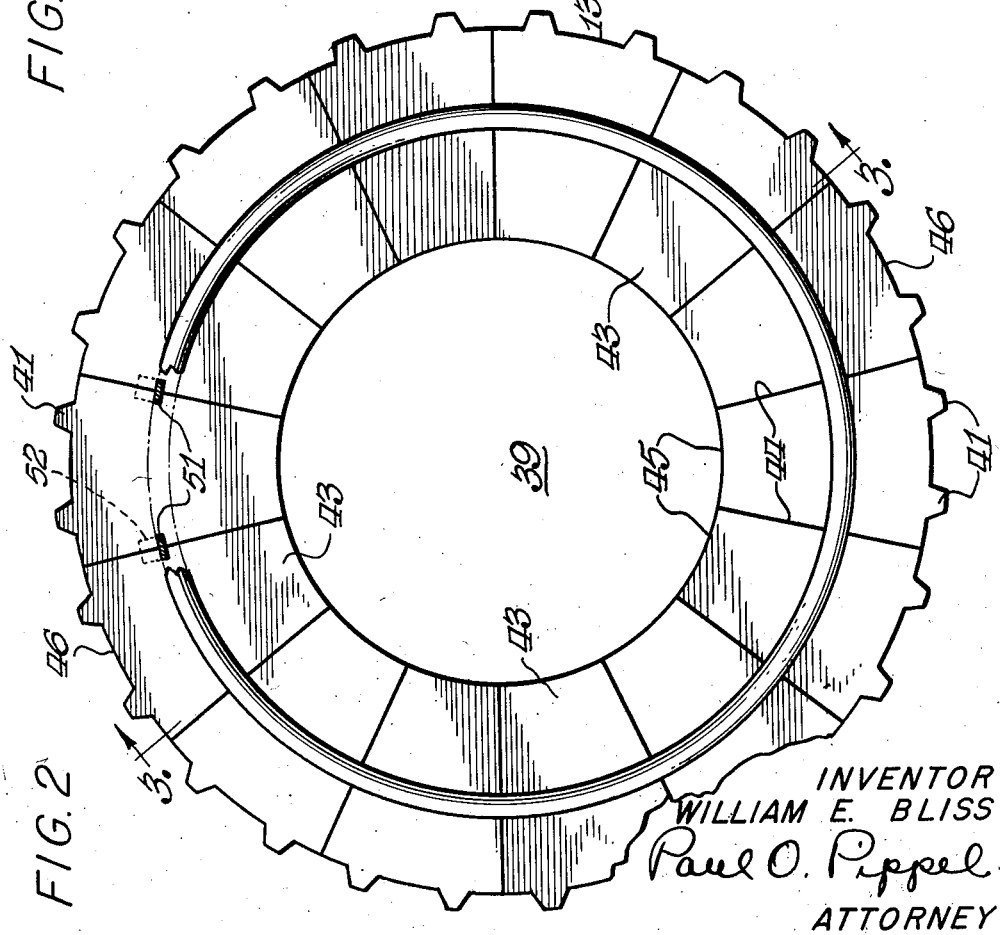
Figure 2 is a cross sectional view taken substantially along line 2—2 of Figure 1 showing the clutch lever disk disassembled from the other parts of the clutch and related power transmission components.

As stated hereinbefore, the present invention is primarily concerned with improvements for the means for multiplying and transferring forces from the piston 36 to the pressure plate 24 in order to frictionally grip the clutch ring 18 between the pressure plate 24 and the clutch ring 27, and thus transmit power from the drive shaft 10 to the driven shaft 13. Such means in the present invention is in the form of a clutch lever disk identified by reference character 38 and includes a plurality of segmental finger levers 43. Each finger lever 43 is substantially flat and has a wedge or pie shape in plan as shown in Figures 2 and 7. The side edges 44 of each finger lever 43 are each contained in a radially extending line extending from the center of the disk 38 when all of the finger levers are assembled as shown in Figure 2. The central circular opening 39 provided in the clutch lever disk 38 is defined by the inner arcuate edges 45 of the assembled finger levers 43. In a similar manner the outer edge 46 of each finger lever 43 is arcuate in plan whereby the outer edge of the assembled clutch lever disk 38 is generally circular. The radius of curvature is somewhat smaller than the circular plane containing the annular ridge 40 of the piston 36 whereby the annular ridge 40 bears against the clutch disk 38 adjacent the opening 39 therein. Each segmental finger lever 43 has its outer edge provided with a pair of radially extending teeth 41 which is adapted to be received in a respective slot 30 whereby the clutch lever disk 38 is non-rotatably keyed to the clutch drum 21. The side edge of each segmental finger lever 43 is each provided with a rectangular notch or slot 47 intermediate the inner and outer peripheries 45 and 46, respectively. Thus when each segmental finger lever 43 is positioned with its side marginal edge 44 substantially abutting and coextensive with the side marginal edge of an adjacent segmental finger lever, a plurality of circumferentially spaced rectangular openings 48 are provided. The rectangular openings 48 are contained within a cylindrical plane which has a diameter greater than the diameter of the opening 39 but less than the diameter of the outer periphery of the clutch lever disk 38.

In order to operatively interconnect the annular series of segmental finger levers 43 of the clutch lever disk 38 a coupling or retainer ring designated generally by numeral 49 and shown in Figure 4 is provided. The coupling ring 49 includes an annular body section 50 having a substantially U-shaped cross section. Extending vertically as viewed in Figure 5 from one leg of the body 50 are a plurality of circumferentially spaced tabs 51. Each tab 51 is adapted to extend through a respective rectangular opening 48 formed by a pair of slots 47. The tabs 51 have a radial length substantially equal to the radial length of the rectangular opening 48 and thereby bridge the juncture between adjacent segmental finger levers 43. It will thus be appreciated that the tabs 51 interlock with the radially extending side edges 44 of the finger levers 43 to prevent movement of the finger levers 43 in a circular direction with respect to the coupling ring 49. To retain the finger levers 43 against axial displacement the free ends 52 are bent substantially at right angles to the general plane of the tabs 51. It will thus be appreciated that each finger lever 43 is axially confined between the tab portions 52 and the edges of the body 50 defining the terminal ends of the legs thereof. The coupling ring 49 is made of relatively thin sheet metal and is easily stamped to have the form shown in Figures 4, 5 and 6. It will also be obvious that it is a simple operation to assemble the finger levers 43 on the coupling ring 49 and then bend the free ends of the tabs 51 to the positions shown in Figure 3. The clutch lever disk 38 is then ready for assembly in the transmission. Furthermore, the entire clutch lever disk 38 may be readily disassembled or one or more of the clutch finger levers 43 may be replaced merely by rebending the free end of the proper tabs 51 to the positions shown in Figure 5 whereby the spring fingers interlocked thereby may be withdrawn from the coupling ring 49.

The embodiment of the invention chosen for the purposes of illustration and description herein is that preferred as a result of selective test based upon requirements for achieving the objects of the invention and developing the utility thereof in the most desirable manner, due regard being had to existing factors of economy, simplicity of design and construction, production methods and the improvements sought to be effected. It will be appreciated, therefore, that the particular structural and functional aspects emphasized herein are not intended to exclude but rather to suggest such other adaptations and modifications of the invention as fall within the spirit and scope of the invention as defined in the appended claims.

What is claimed is:

1. A fabricated circular clutch lever disk for use in a clutch mechanism as described, comprising a plurality of flat levers arranged side by side in a circle, each of said levers having an edge containing a radially extending line parallel to an edge of an adjacent lever; means for joining each of said levers to an adjacent lever including a tab extending axially through each pair of adjacent levers at the adjacent radially extending edges thereof; and means for rigidly interconnecting said tabs.

2. A fabricated circular clutch lever disk for use in a clutch mechanism as described, comprising a plurality of levers arranged side by side, each of said levers having an edge containing a radially extending line, said edge being adjacent to and substantially parallel to an edge of an adjacent lever, each of said levers further having a pair of axially spaced and parallel flat surfaces; and means for joining each of said levers to an adjacent lever including a tab extending axially through each pair of adjacent levers at the adjacent radially extending edges thereof and having portions thereof axially disposed adjacent the respective opposite flat surfaces of said levers and means for rigidly interconnecting the portions of said tabs disposed adjacent one of said respective opposite flat surfaces of said levers.

3. A fabricated circular clutch lever disk for use in a clutch mechanism as described, comprising a plurality of levers arranged side by side in a circle; each of said levers having an edge containing a radially extending line, said edge being adjacent to and substantially parallel to an edge of an adjacent lever; and means for joining each of said levers to an adjacent lever including a plurality of tabs, each of said tabs extending axially through a respective pair of adjacent levers at the adjacent radially extending edges thereof, and annular means rigidly interconnecting said tabs.

4. A fabricated circular clutch lever disk for use in a clutch mechanism as described, comprising a plurality of segmental, wedge-shaped levers arranged side by side in a circle whereby one edge of each lever contains a radially extending line and is closely adjacent to and substantially parallel to an edge of an adjacent lever, each of said levers having a pair of open end slots radially spaced inwardly of the outer periphery of the disk and opening into a respective radially extending edge thereof, the slots of said levers lying substantially in a cylindrical plane whereby each slot of each lever forms an opening with a slot of an adjacent lever; and means for joining each of said levers to an adjacent lever including a plurality of tabs, each of said tabs extending axially through a respective opening formed by the adjacent slots of adjacent levers, and annular means rigidly interconnecting said tabs.

5. A fabricated circular clutch lever disk for use in a clutch mechanism as described, comprising a plurality of flat, segmental wedge-shaped levers arranged side by side in a circle, one edge of each lever containing a radially extending line and being disposed closely adjacent to and substantially parallel to an edge of an adjacent lever, each of said levers having a pair of open end rectangular slots opening into a respective radially extending edge thereof, the slots of said levers lying substantially in a cylindrical plane; and means for joining each lever to an adjacent lever including an annular coupling ring comprising an annular body disposed on one axial face of the disk and a plurality of circumferentially spaced axially extending tabs integrally formed with said annular body, each of said tabs being disposed within a respective pair of adjacent slots, said tabs having a substantially rectangular cross-section and being of sufficient size to bridge the junctures between adjacently extending edges of said levers, the free ends of said tabs being bent to extend radially outwardly and being disposed on the axial face of said disk opposite said annular body.

6. A fabricated clutch lever disk for use in a clutch mechanism having a rotatable clutch drum comprising a sleeve having a portion thereof provided with circumferentially spaced, axially extending slots, comprising a plurality of flat wedge-shaped levers arranged side by side in a circle, said levers having arcuate inner and outer edges and radially extending side edges, each radially extending edge of each of said levers being provided with an open end slot in circular alignment with an open end slot formed in the radially extending edge of an adjacent lever, the outer arcuate edges of said levers being provided with radially projecting teeth receivable in respective slots of said clutch drum sleeve to non-rotatably connect said levers to said sleeve; means for connecting each lever to an adjacent lever including a tab extending axially through a respective pair of adjacent slots; and means for rigidly interconnecting said tabs.

7. A fabricated clutch lever disk substantially as set forth in claim 6, in which, said tabs are of sufficient size to bridge the junctures between adjacent radially extending edges of said levers, and said means for rigidly interconnecting said tabs includes annular means.

8. A fabricated circular clutch lever disk substantially as set forth in claim 7, in which, the free ends of said tabs are bent to extend radially outwardly and are disposed on one axial face of said disk, and said annular means rigidly interconnecting said tabs includes an annular body integrally formed with said tabs and disposed on the axial face of said disk opposite the free ends of said tabs.

References Cited in the file of this patent
UNITED STATES PATENTS

| | | |
|---|---|---|
| 828,647 | Gibbs | Aug. 14, 1906 |
| 2,247,298 | Kattwinkel | June 24, 1941 |
| 2,423,881 | Du Bois | July 15, 1947 |
| 2,682,943 | Root | July 6, 1954 |